United States Patent [19]

Carlin et al.

[11] Patent Number: 4,893,300

[45] Date of Patent: Jan. 9, 1990

[54] TECHNIQUE FOR REDUCING DISTORTION CHARACTERISTICS IN FIBER-OPTIC LINKS

[75] Inventors: James W. Carlin, Holmdel; Anthony C. Chipaloski, Howell; Robert P. Schloss, East Brunswick, all of N.J.

[73] Assignees: American Telephone and Telegraph Company, New York, N.Y.; AT&T Bell Laboratories, Murray Hill, N.J.

[21] Appl. No.: 226,697

[22] Filed: Aug. 1, 1988

[51] Int. Cl.$^4$ ............................................. H04B 9/00
[52] U.S. Cl. .................................. 370/3; 455/612; 455/617
[58] Field of Search .............. 370/3; 455/606, 607, 455/609, 612, 617, 618, 619, 608, 610, 611

[56] References Cited

U.S. PATENT DOCUMENTS

| | | | |
|---|---|---|---|
| 3,202,928 | 8/1965 | Prior | 330/124 |
| 3,383,618 | 5/1968 | Engelbrecht | 330/149 |
| 3,917,906 | 11/1975 | Johnson | 370/120 |
| 4,232,385 | 11/1980 | Hara | 370/3 |
| 4,314,250 | 2/1982 | Hannell et al. | 343/100 SA |
| 4,316,201 | 2/1982 | Christou | 357/67 |
| 4,414,686 | 11/1983 | Lenz | 455/20 |
| 4,453,139 | 6/1984 | Labaar | 330/56 |
| 4,661,995 | 4/1987 | Kashiwagi | 455/183 |
| 4,768,186 | 8/1988 | Bodell | 370/3 |

OTHER PUBLICATIONS

Darcie et al., *Electronic Letters*, vol. 21, No. 16, Aug. 1, 1985, pp. 665-666.

Errata, *Electronic Letters*, vol. 22, No. 11, May 22, 1986, p. 619.

Bowers et al., *Electronic Letters*, vol. 21, No. 18, Aug. 29, 1985, pp. 812-814.

Bowers et al., *Electronic Letters*, vol. 21, No. 23, Nov. 7, 1985, pp. 1090-1091.

Gilmore, *IEEE Trans. on MTT*, vol. MTT-34, No. 12, Dec. 1986, pp. 1294-1307.

*Primary Examiner*—Benedict V. Safourek
*Assistant Examiner*—Leslie Van Beek
*Attorney, Agent, or Firm*—Erwin W. Pfeifle

[57] ABSTRACT

The present invention relates to a technique for suppressing intermodulation products introduced by non-linearities of a laser in a multicarrier Freqeuncy Division Multiplexed (FDM) fiberoptic link. More particularly, for two or more closely spaced FDM channel information signals within a predetermined band of frequencies in an FDM optical transmission system, third-order intermodulation products, which are produced by nonlinearities of a transmitting laser, also fall in-band and provide interference in the channel information signals. Suppression of these in-band intermodulation products is achieved in the present invention by the simultaneous transmission of a strong suppression tone which is disposed outside the band of the FDM channel information signals being transmitted, and at a frequency within the overall response band of the transmitting laser such that the mixing of the channel information signals and the suppression tone will provide minimal, or no, intermodulation products in the frequency band of the FDM channel information signals.

10 Claims, 2 Drawing Sheets

TECHNIQUE FOR REDUCING DISTORTION CHARACTERISTICS IN FIBER-OPTIC LINKS

TECHNICAL FIELD

The present invention relates to a technique for suppressing intermodulation products in a predetermined frequency band of a plurality of N desired frequency division multiplexed (FDM) channel information signals in a fiberoptic link by simultaneously transmitting, along with the plurality of N FDM channel signals, a suppression tone which is (1) at a higher power level than the power level of the individual FDM channel information signals, and (2) at a frequency outside the predetermined frequency band of the N desired FDM channel information signals.

DESCRIPTION OF THE PRIOR ART

One of the factors that limit the performance of analog fiberoptic links is the intermodulation distortion introduced by nonlinearities in the modulation characteristics of the semiconductor laser used. This distortion is classically evidenced by the generation of new frequencies that were not present in the electrical input to the analog link. For two closely spaced in-band signals at frequencies $f_1$ and $f_2$, the third-order intermodulation products $2f_1-f_2$ and $2f_2-f_1$ also fall in-band.

Various techniques have been devised to reduce intermodulation products in radio and electrical transmission systems. One typical example is demonstrated in U.S. Pat. No. 3,202,928, issued to H. T. Prior on Aug. 24, 1965, where plurality of signal components, in phase with each other, are derived from the input signal and individually amplified, each component corresponding to the input signal. In sequence, the phase of certain ones of the components are reversed, certain ones of the components are attenuated, and all signal components are then recombined to cancel out all but the fundamental signal voltages in the signal components. Another example is shown in U.S. Pat. No. 3,383,618, issued to R. S. Englebrecht on May 14, 1968, which discloses electronic transmission circuitry including (1) an amplifier that simultaneously transmit energy at a plurality of frequencies, and (2) a compensation circuit disposed at the output line of the amplifier to reduce the effects of intermodulation products.

In optical systems, the article by T. E. Darcie et al. in *Electronic Letters*, Vol. 21, No. 16, 1st Aug. 1985, at pages 665–666 discusses intermodulation and harmonic distortion in InGaAsP, distributed feedback (DF), and Fabry-Perot lasers. A correction of equation 3 of this article was made in "Errata" in *Electronic Letters*, Vol. 22, No. 11, 22nd May 1986 at page 619. In this article, it was determined that these various laser structures with wavelengths of 1.3 and 1.5 $\mu$m generate approximately the same distortion, and the lasers with strong damping have superior distortion characteristic. It was further determined that such lasers, because of their wide bandwidth, would be suitable for subcarrier system applications where a plurality of channels are frequency division multiplexed onto a fiber-optic link.

The problem remaining in the prior art is to provide a technique to suppress intermodulation products in analog fiberoptic links.

SUMMARY OF THE INVENTION

The foregoing problem in the prior art has been solved in accordance with the present invention which relates to a technique for substantially reducing in-band intermodulation distortion products in a fiberoptic link which is propagating an frequency division multiplexed (FDM) lightwave signal including a plurality of N FDM optical channel information signals in a predetermined frequency band by the simultaneous transmission of a strong out-of-band suppression tone. To provide maximum intermodulation product suppression within the fiberoptic link, it is preferable that the simultaneously transmitted suppression tone be (1) at a power level that is approximately +7 to +10 dB higher than the envelope power of the desired in-band FDM channel information signals, and (2) at a frequency which is at an out-of-band location from the FDM channel signals such that the mixing of all frequencies between the suppression tone and the in-band FDM channel information signals will not provide intermodulation products in the band of the FDM channel information signals.

DETAILED DESCRIPTION

Figure 1:
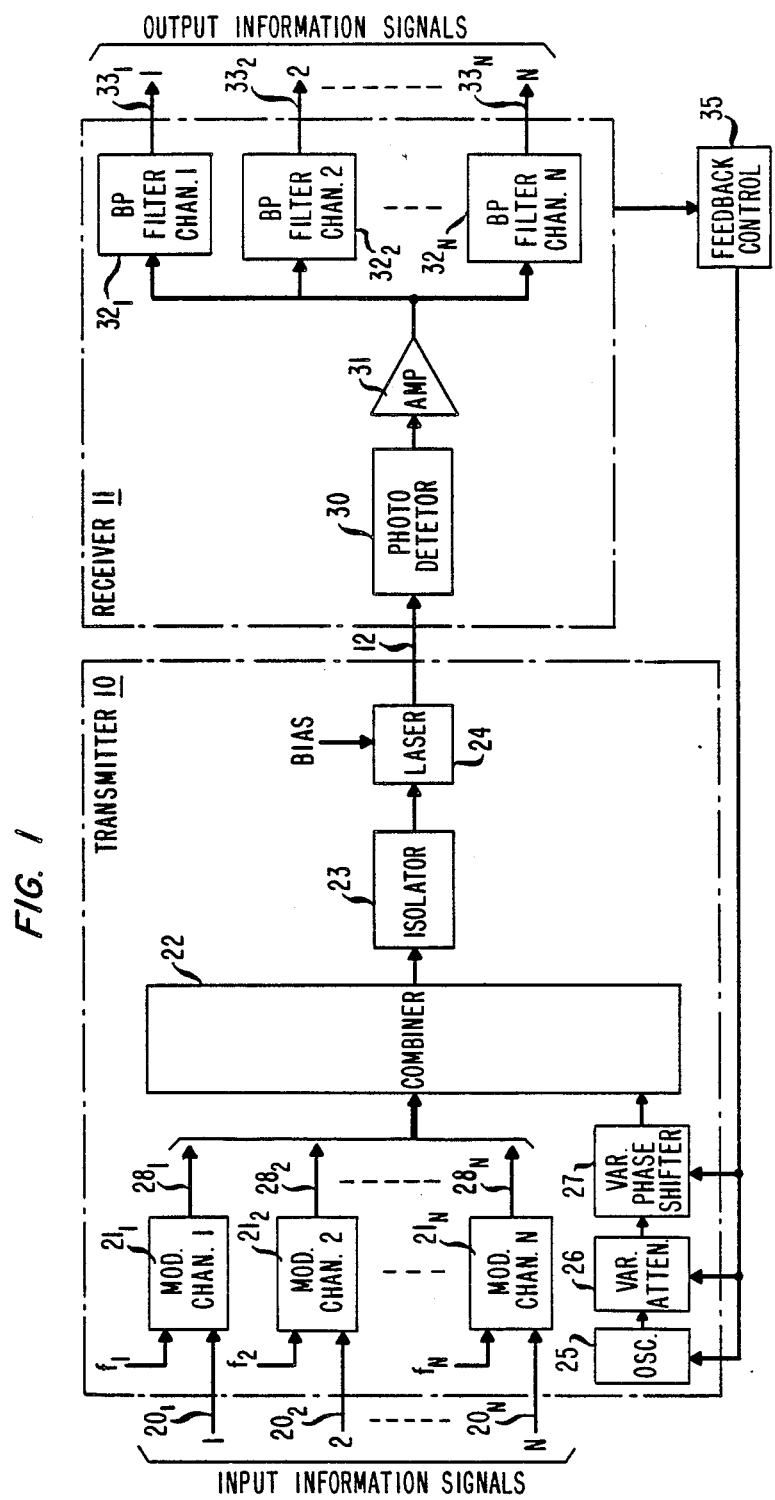
FIG. 1 is a block diagram of an exemplary interconnected transmitter and receiver for practicing the present invention and substantially reduce in-band intermodulation products in microwave fiberoptic links.

FIG. 1 illustrates an exemplary arrangement of an optical Frequency Division Multiplexing (FDM) communication system comprising a transmitter 10 and an optical receiver 11 which are interconnected by a fiber-optic link 12, which arrangement is capable of suppressing pertinent intermodulation products in accordance with the present invention. In transmitter 10, a plurality of N separate electrical information signals are received over lines $20_1$ to $20_N$ as first inputs to modulators $21_1$ to $21_N$, respectively. Each of the modulators $21_i$ use a different channel carrier $f_i$ such that when the modulated signals are received over lines $28_1-28_N$ and combined in a combiner 22, the modulated signals fall within adjacent, non-overlapping, frequency bands and produce a combined FDM output signal within a predetermined overall FDM frequency band. The combined FDM output signal from combiner 22 is then preferably passed through a broadband radio frequency (RF) isolator 23 before being applied to the input of a laser transmitter 24. It is to be understood that isolator 23 is used to reduce the reflected RF signals due to mismatches at the input to laser transmitter 24 which impinge on the output of the modulators 21, and theoretically isolator 23 could be eliminated if the system were properly optimized.

For purposes of description hereinafter it will be assumed that laser transmitter 24 is a semiconductor diode laser transmitter, but it is to be understood that any other suitable laser transmitter could be substituted therefor. In the diode laser transmitter 24, a DC bias is applied to the laser in well-known ways to generate a predetermined lightwave carrier signal. The electrical input FDM signal from isolator 23 is added to the DC bias for laser 24 using, for example, a microwave Tee (not shown), and the input FDM signal then simultaneously modulates the laser 24 drive current to modulate the output light intensity of laser 24. Non-linearities in the modulation characteristics of a semiconductor laser, as used for laser 24, introduce intermodulation products which affect the performance of the fiberoptic link 12.

Figure 2:
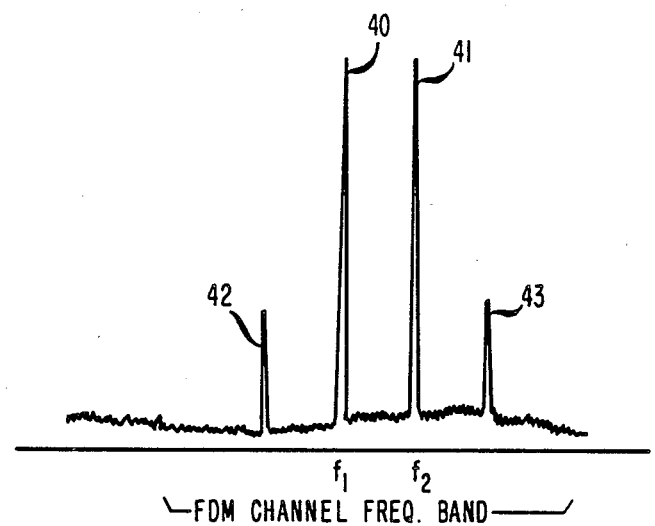
FIG. 2 is an exemplary spectrum of desired and intermodulation products for a two-channel system in the FIG. 1 arrangement without a suppression tone being applied.

As shown in FIG. 2, for two closely spaced in-band signals 40 and 41, as exemplary signals $f_1$ and $f_2$, used for channels 1 and 2 associated with modulators $21_1$ and $21_2$, the third order intermodulation products 42 and 43 representing $2f_1-f_2$ and $2f_2-f_1$, respectively, also fall in-band and cause interference in the desired in-band signals. It can be seen that where a plurality of N closely spaced FDM channels are transmitted by laser transmitter 24, many intermodulation products can be produced by the nonlinearities of laser 24.

In accordance with the present invention, these intermodulation products are suppressed by the introduction of a strong suppression tone which is outside the frequency band of the FDM channel signals, into the input signal to laser transmitter 24. As shown in FIG. 1, this suppression tone can be generated by an oscillator 25, such as a voltage controlled oscillator (VCO), and added to the N modulated FDM channel signals from modulators $20_1$ to $20_N$ in combiner 22 before being passed through isolator 23 to the input of laser 24. To enable the suppression tone to be of a desired power level and frequency, a variable attenuator 26, to adjust the power, and a phase shifter 27, to adjust the frequency, can be disposed between oscillator 25 and combiner 22. It has been found that for most lasers suppression of the intermodulation products can be effected if the suppression tone (1) is at a power level approximately $+7$ to $+10$ dB above the envelope power of the desired FDM signals, (2) is at a frequency where this suppression tone and the FDM desired channel signals will not produce intermodulation products within the band of the FDM signals, and (3) lies within the laser's overall operating band. For example, if laser 24 operates in a 6 GHz overall frequency band and the desired FDM signals have a band from 3.7 to 4.2 GHz in the 6 GHz operating band, then the suppression tone preferably would be placed near the 6 GHz frequency area to avoid in-band products. It is preferred that the suppression tone be placed above the desired FDM channel frequency band, but it is to be understood that the suppression tone can alternatively be placed below such desired FDM channel frequency band where the above-listed three parameters can be suitably satisfied. A frequency for the suppression tone which can satisfy the above-mentioned three parameters can be determined mathematically using, for example, a computer program, by first determining which products would be produced between a particular suppression tone and the desired FDM signals, and then chosing the tone which provides no, or the least amount of, in-band products.

Figure 3:
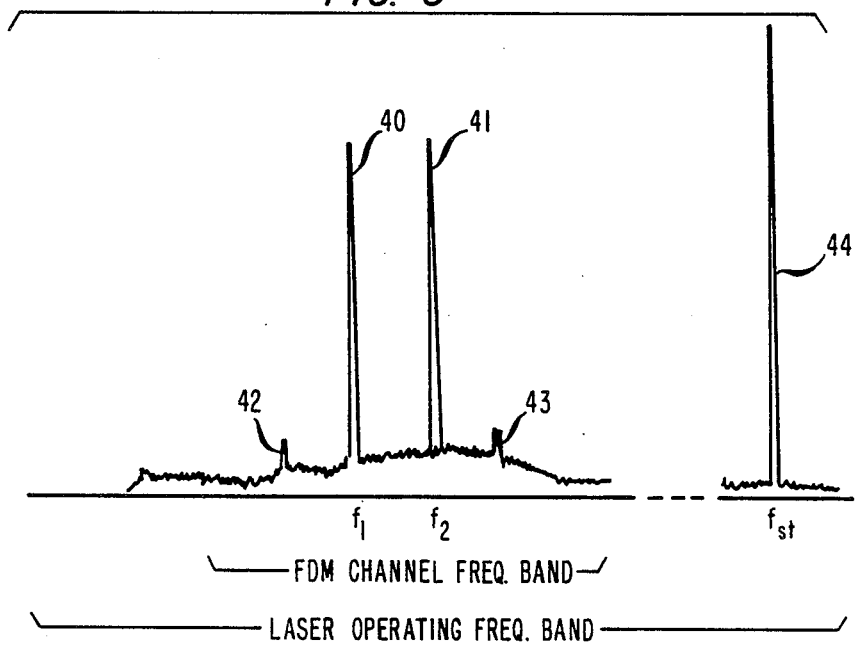
FIG. 3 is the exemplary spectrum of FIG. 2 with a suppression tone being applied in the arrangement of FIG. 1 in accordance with the present invention.

FIG. 3 illustrates the exemplary frequency spectrum that was generated for the exemplary two-channel system of FIG. 2 with a strong suppression tone $f_{st}$ 44 introduced into the transmitted waveform. As shown when comparing FIGS. 2 and 3, it was found that suppression tone $f_{st}$ 44 substantially reduced the intermodulation products 42 and 43.

Returning to FIG. 1, the output of laser transmitter 24 is transmitted over fiberoptic link 12 to receiver 11 and received at a photodetector 30 which transforms the received optical FDM signal into a corresponding baseband electrical FDM signal. The electrical FDM signal is amplified by a suitable broadband amplifier 31 as is well known in the art. The resultant amplified electrical FDM signal is simultaneously delivered to a plurality of N bandpass filters $32_1$ to $32_N$ which are each tuned to pass only a specific separate one of the N received FDM channels and reject all other channel signals. The individual bandpass filtered channel signals on leads $33_1$ to $33_N$ are then delivered to other processing circuitry which might be necessary in order to deliver the separate channel signals in proper form to the appropriate end users.

It is to be understood that the embodiments described above are simply illustrative of the principles of the invention and that various modifications and changes could be made by those skilled in the art and still fall within the spirit and scope thereof. For example, in FIG. 1 the plurality of N FDM channel signals at the output of modulators $21_1$ to $21_N$ could have been formed remote from transmitter 10 into a single electrical FDM signal and supplied to transmitter 10 as a direct input to combiner 22 for combination with the suppression tone from oscillator 25, thereby eliminating the need for modulators 21. Alternatively, the N signals on leads $20_1$ to $20_N$ that are provided as inputs to modulators $21_1$ to $21_N$, respectively, could each comprise a separate FDM input signal including multiple channels of information that are then modulated appropriately for combination in combiner 22 with the suppression tone as described hereinbefore.

It is to be further understood that dynamic control of the present intermodulation product suppression technique can also be provided. For analog transmissions, this can be accomplished by the inclusion of a feedback circuit 35 between receiver 11 and transmitter 10 that can include a narrow bandpass filter, or filters, at the receiver which are arranged to receive the output signal from amplifier 31 and pass the narrow frequency band(s) where intermodulation products would be found between two of the channels. Feedback control circuit 35 can then measure the power of the envelope of the output signal of the narrow bandpass filter, or filters, with, for example, a diode and generate a DC error output signal for transmission back to transmitter 10 to dynamically adjust either one or all of VCO 25, variable attenuator 26, or variable phase shifter 27 to minimize the output power at the narrow bandpass filter or filters. For digital signal transmission, feedback control circuit 35 can include a Bit Error Rate (BER) detector, or detectors, disposed to receive the output signal from a one or all of the channel filters 32 and generate a DC error voltage output in response to a measured BER or all of the BERs. Feedback control circuit 35 would then translate the input signal from the BER detector, or detectors, into an appropriate DC error signal for transmission back to transmitter 10 to appropriately adjust VCO 25, variable attenuator 26, or variable phase shifter 27 to minimize the intermodulation products and improve the BER at receiver 11.

We claim:

1. A lightwave transmitter for suppressing intermodulation products in a lightwave frequency division multiplexed (FDM) transmitter output signal, the transmitter comprising:

means for receiving an electrical FDM information signal comprising a plurality of N channel information signals disposed in separate non-overlapping portions of a predetermined FDM channel frequency band;

means for providing an electrical intermodulation product suppression signal comprising a tone which is (1) at a predetermined power level above the power level of the channel information signals in the electrical FDM information signal, and (2) disposed outside of the predetermined FDM channel frequency band at a frequency that causes minimal intermodulation products to be formed within the predetermined FDM channel frequency band;

combining means for combining (1) the electrical FDM information signal from the receiving means, and (2) the electrical intermodulation suppression signal from the providing means to generate a combined resultant FDM output signal; and means for generating a predetermined lightwave carrier, the generating means being responsive to the combined resultant FDM output signal from the combining means for intensity modulating the lightwave carrier to generate the lightwave FDM transmitter output signal.

2. An optical transmitter according to claim 1 wherein the power level of the intermodulation suppression signal is at a level between +7 and +10 dB above the envelope power of the N channel information signals forming the electrical FDM information signal.

3. An optical transmitter according to claims 1 or 2 wherein the transmitter further comprises:
an isolator disposed between the combining means and the lightwave generating means.

4. An optical transmitter according to claims 1 or 2 wherein the transmitter further comprises:
a plurality of N modulators, each modulator receiving a separate one of the plurality of N channel information signals and modulating that separate one channel with a carrier which is different from that used by any of the other modulators for generating the electrical FDM information signal received at the receiving means.

5. An optical transmitter according to claims 1 or 2 wherein the receiving means comprises:
an input terminal receiving a signal including the FDM modulated plurality of N information channels.

6. An optical transmitter according to claim 1 wherein the transmitter further comprises:
means for adjusting the power and frequency of the electrical intermodulation suppression signal.

7. An optical transmitter according to claim 6 wherein the adjusting means is responsive to a control signal from a remote receiver indicating a current level of intermodulation products in the resultant transmitter FDM lightwave output signal received at the remote receiver for adjusting the power and/or frequency of the electrical intermodulation suppression signal to minimize intermodulation products at the remote receiver.

8. A method of suppressing intermodulation products in a Frequency Division Multiplexed (FDM) lightwave signal to be transmitted over a lightwave transmission link, the method comprising the steps of:
(a) combining (1) an electrical FDM information signal including a plurality of N FDM channel information signals within a predetermined frequency band, each of the channel information signals being at substantially a same predetermined power level, and (2) a electrical suppression tone which is at a predetermined power level above the power level of the individual channel signals and at a frequency outside the predetermined frequency band of the N FDM channel information signals for generating a combined resultant FDM output signal; and
(b) intensity modulating a lightwave carrier of a lightwave generating means in accordance with the combined resultant FDM output signal from step (a) to produce an FDM lightwave output signal for transmission over the lightwave transmission link.

9. The method according to claim 8 wherein in performing step (b), the suppression tone is at a power level between +7 and +10 dB above the envelope power of the N FDM channel information signals.

10. The method according to claim 8 wherein the method comprises the further step of:
(c) adjusting the power level and frequency of the electrical suppression tone in step (a) in response to a control signal indicating a current level of intermodulation products in the FDM lightwave output signal received at a remote receiver to minimize the intermodulation products at the remote receiver.

* * * * *